United States Patent

Jordan, Jr.

[15] 3,674,927

[45] July 4, 1972

[54] VIDEO SHADING MODULATOR WITH PARAPHASE CONTROL SIGNALS APPLIED RESPECTIVELY TO VARIABLE IMPEDANCE DEVICES IN SERIES AND IN PARALLEL WITH THE VIDEO SIGNAL PATH

[72] Inventor: Thomas M. Jordan, Jr., Liverpool, N.Y.

[73] Assignee: General Electric Company

[22] Filed: March 16, 1971

[21] Appl. No.: 124,777

[52] U.S. Cl. ..........178/7.2, 178/DIG. 39

[51] Int. Cl. ..........H04n 5/40

[58] Field of Search ..........178/DIG. 39, 7.2

[56] References Cited

UNITED STATES PATENTS 2,404,939 7/1946 Bailey..........178/7.2

2,981,793 4/1961 Hurford..........178/7.2

*Primary Examiner*—Robert L. Griffin

*Assistant Examiner*—Donald E. Stout

*Attorney*—Frank L. Neuhauser, Oscar B. Waddell, Joseph B. Forman and James J. Williams

[57] ABSTRACT

To correct for degrading optical and pickup tube effects, amplitude of a video signal is varied by a shading signal. The shading signal is furnished to the input of a phase splitter and the resulting signals of opposite phase are furnished to respective gates of a pair of closely matched, variable impedance devices, such as field effect transistors, one such device being connected in series with the video signal path and the other such device being connected in shunt with the video signal path. By using matched field effect transistors as the variable impedance devices, their quiescent output resistances are substantially identical and the circuit, therefore, exhibits symmetry.

6 Claims, 8 Drawing Figures

INVENTOR:
THOMAS M. JORDAN, JR.
BY Marvin Snyder
HIS ATTORNEY.

INVENTOR:
THOMAS M. JORDAN, JR.
BY Marvin Snyder
HIS ATTORNEY.

VIDEO SHADING MODULATOR WITH PARAPHASE CONTROL SIGNALS APPLIED RESPECTIVELY TO VARIABLE IMPEDANCE DEVICES IN SERIES AND IN PARALLEL WITH THE VIDEO SIGNAL PATH

This invention relates to video signal processing apparatus, and more particularly to apparatus for employing shading waveforms to modulate a video signal.

In a television camera, video signals are generated by each pickup tube. These signals are essentially responsive to the optical image falling upon the pickup tube. The optical image is communicated to the pickup tube through an optical lens system. However, the characteristics of the optical system by which light is transmitted to the pickup tube may be such as to produce distortion in shading of the image falling on the pickup tube. Nonlinearities in the response of the pickup tube and/or the output circuitry associated therewith may also produce shading distortion in the viewed image. For example, if the scene viewed by the camera is a uniform expanse of color, such as a uniformly white sheet of cardboard, and is uniformly illuminated, the signal produced by the camera should result, at the receiving monitor, in a faithful reproduction of the uniformly illuminated white sheet of cardboard. However, distortion introduced by the optical system of the camera, and nonlinearities in the response of the pickup tube and/or the output circuitry associated with the pickup tube, may distort the image shading, causing the image to appear, for example, to have a bright center and darker corners, resembling the effect produced by a spotlight. Such distortion may be compensated for in the camera circuitry by using a predetermined signal to amplitude modulate the video waveform generated by the pickup tube so as to improve uniformity of the video signal.

Shading modulators employing semiconductors have hitherto been severely affected by temperature changes within the normal operating temperature range of television cameras. As a result, such shading modulators have exhibited unstable gain, and modulation of the video signal has similarly been unstable with temperature variation. Moreover, shading modulators employed heretofore have required reactive circuitry to compensate for degradation in frequency response, and have exhibited severely limited modulation. Previous shading modulators have also caused degradation in linearity of the video signal or differential gain when the shading signal is terminated. The present invention avoids these deficiencies of the prior art.

Accordingly, one object of the invention is to provide an improved video signal shading modulator circuit which is substantially insensitive to temperature changes over the normal operating temperature range of the television camera in which it is installed.

Another object is to provide a shading modulator circuit exhibiting a wide range in modulation without requiring reactive circuitry to compensate for degradation in frequency response as a result of variations in modulation levels.

Another object is to provide a shading modulator which does not degrade video signal linearity when the shading signal is not present.

Briefly, in accordance with a preferred embodiment of the invention, a video signal shading modulator circuit comprises first and second controllable output resistance devices, and shading signal generating circuitry producing first and second output signals that are essentially identical in waveform but opposite in polarity. The first controllable output resistance device is connected in series with circuitry transmitting a video signal, while the second controllable output resistance device is connected in parallel with the circuitry transmitting the video signal. The shading signal generating circuitry is coupled to a control input of the first and second controllable output resistance devices, respectively, so that the first output signal controls output resistance of the first device and the second output signal controls output resistance of the second device. As a result, high output resistance of the first device occurs simultaneously with low output resistance of the second device, and low output resistance of the first device coincides in time with high output resistance of the second device.

BRIEF DESCRIPTION OF THE DRAWING

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE INVENTION

Figure 1:
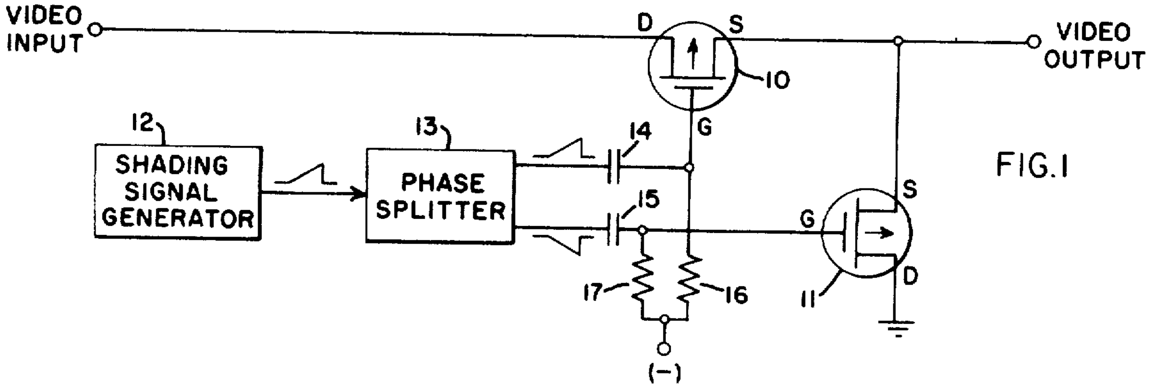
FIG. 1 is a schematic diagram of the video shading modulator of the present invention.

FIG. 1 is a schematic diagram of the invention showing a pair of field effect transistors (FETs) 10 and 11 for controllably varying a video input signal. FETs are desirable for use in the circuitry of the invention because of their wide range of output resistance which is easily controllable. Each of FETs 10 and 11 is illustrated as a p-channel, insulated gate field effect transistor having a source electrode S, a drain electrode D and a gate electrode G. FETs 10 and 11, which have their source electrodes connected together, preferably are as closely matched in electrical and temperature characteristics as possible, in order to maximize circuit symmetry. Formation of FETs 10 and 11 on a single crystal of semiconductor material, as typically accomplished by employing integrated circuit fabrication techniques, can greatly facilitate achievement of such matched characteristics.

A shading signal, produced by a shading signal generator 12, is furnished to a phase splitter 13. The noninverting output terminal of phase splitter 13, designated (+), and the inverting terminal of the phase splitter, designated (−), are coupled to the gates of FETs 10 and 11, respectively, through coupling capacitors 14 and 15, respectively. Negative bias is supplied to the gate of FETs 10 and 11 through bias resistances 16 and 17, respectively. Positive video input signals clamped to ground are furnished from a low impedance source to the drain of FET 10, and video output signals, amplitude-modulated by the shading signals, are produced at the interconnected source electrodes of FETs 10 and 11. Thus, FETs 10 and 11 are effectively in series and shunt, respectively, with the apparatus (not shown) furnishing the video input signal to the shading modulator.

By using matched FETs in the circuit of FIG. 1, source-to-drain resistances of each FET are substantially equal if the FETs receive bias voltages which are essentially equal and signal voltages which are likewise substantially equal. Under conditions of zero signal voltage on the gate therefore, each of FETs 10 and 11 exhibit essentially identical quiescent source-to-drain resistance, or output resistance,so that the amplitude of video output signal is substantially one half that of the video input signal. Thus, in absence of any shading signal from generator 12, the video output signal is essentially identical in waveform to the video input signal, but attenuated by 50 percent.

At the time the camera generating the video input signal is initially activated, shading characteristics of the camera are preferably checked. This may be done by viewing a uniformly illuminated sheet of white cardboard with the camera, and displaying the viewed image on a television monitor. If the camera responds with uniform shading characteristics, the displayed image will be a uniformly illuminated white figure of the shape of the viewed cardboard. If such is the case, the shading signal generator need not be energized. Situations of this type are rare, however, in that distortion of shading usually occurs as a result of the optical or electrical characteristics of the camera.

Figure 2:
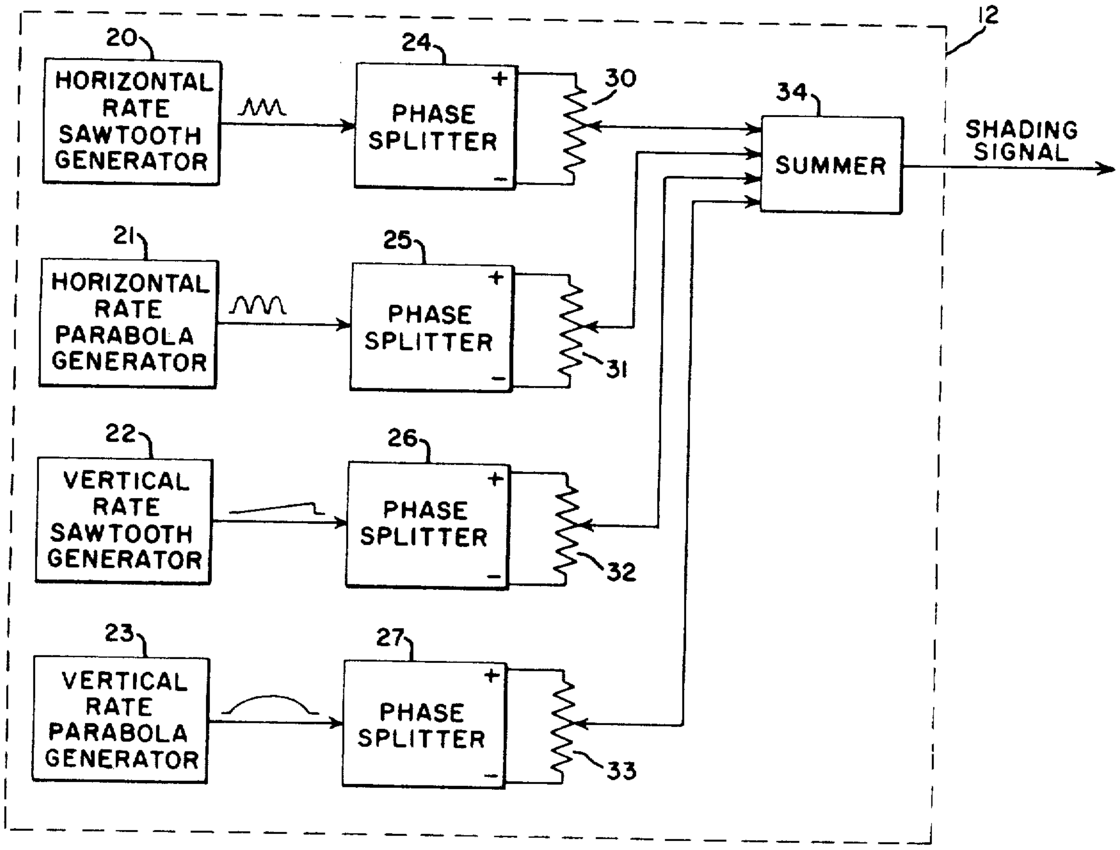
FIG. 2 is a block diagram of circuitry that may be employed as the shading signal generator shown in FIG. 1.

In event shading distortion is noted in the displayed image, as evidenced by the viewed white cardboard appearing to be nonuniformly illuminated, shading signal generator 12 is activated so as to generate a signal which amplitude modulates the video signal. The circuitry of shading signal generator 12, as illustrated in FIG. 2, comprises a horizontal rate sawtooth waveform generator 20, a horizontal rate parabolic waveform generator 21, a vertical rate sawtooth waveform generator 22 and a vertical rate parabolic waveform generator 23, each of which furnishes a signal to a phase splitter 24, 25, 26 and 27, respectively. The vertical rate is thus typically 60 Hz while the horizontal rate is typically 15, 750 Hz in conventional U. S. television broadcasting, although other vertical and horizontal rates may be utilized where desired.

Each of phase splitters 24, 25, 26 and 27 has a variable potentiometer 30, 31, 32 and 33 respectively connected across the inverting terminal designated (−) and the noninverting terminal designated (+) of the respective phase splitters. The variable tap of each of these potentiometers is connected to a respective input of a summer 34. The output signal of summing circuit 34, which algebraically sums the signals applied to its inputs, constitutes the shading signal produced by shading signal generator 12. The waveform produced by signal generator 12 may thus comprise a composite signal made up of a nonlinear waveform recurring at the vertical rate and a nonlinear waveform recurring at the horizontal rate. By adjusting the tap on each of variable potentiometers 30, 31, 32 and 33, the waveform produced by summer 34 may be formed into an infinite variety of shapes. Specifically, by setting the variable tap on any of potentiometers 30, 31, 32 and 33 at the uppermost location thereon, the signal provided at the tap is comprised solely of the noninverted waveform produced by the phase splitter connected thereto, while by setting the tap at the lowermost location thereon, he signal at the tap is comprised solely of the inverted waveform produced by the phase splitter. Settings of the variable tap intermediate the uppermost and center position result in a waveform at the tap comprised of the noninverted waveform produced by the phase splitter but reduced in amplitude, while settings of the variable tap intermediate the lowermost and center positions result in a waveform at the tap comprised mainly of the inverted waveform produced by the phase splitter but reduced in amplitude. When the variable tap is set at the center position, the output signal produced at the tap is essentially zero, since at this point on the potentiometer the equal and opposite signals applied to either side of the potentiometer are balanced out. Summer 34 algebraically totals the output signals produced by the variable taps on potentiometers 30, 31, 32 and 33 in order to arrive at the shading signal which modulates the video signal amplitude to minimize shading errors in the image to be displayed.

Activation of shading signal generator 12 causes waveforms of equal amplitude but opposite polarity to be produced by phase splitter 13 illustrated in FIG. 1. The noninverted waveform is applied to the gate of FET 10, while the inverted waveform is applied to the gate of FET 11. Thus, the positive-going signals produced by shading signal generator 12, source-to-drain resistance of FET 10 is increased, due to the gate thereof being driven positive, while source-to-drain resistance of FET 11 is decreased, due to the gate thereof being driven negative. Accordingly, the video signal experiences increased series impedance and lowered shunt impedance, both of which cause a decrease in amplitude of video signal produced at the output terminal of the circuit. Similarly, for negative-going signals produced by shading signal generator 12, source-to-drain resistance of FET 10 is decreased, due to the gate thereof being driven negative, while source-to-drain resistance of FET 11 is increased, due to the gate thereof being driven positive. In the latter instance, the video signal experiences decreased series impedance and increased shunt impedance, both of which cause an increase in amplitude of video signal produced at the output terminal of the circuit.

Figures 3A, 3B, 3C:
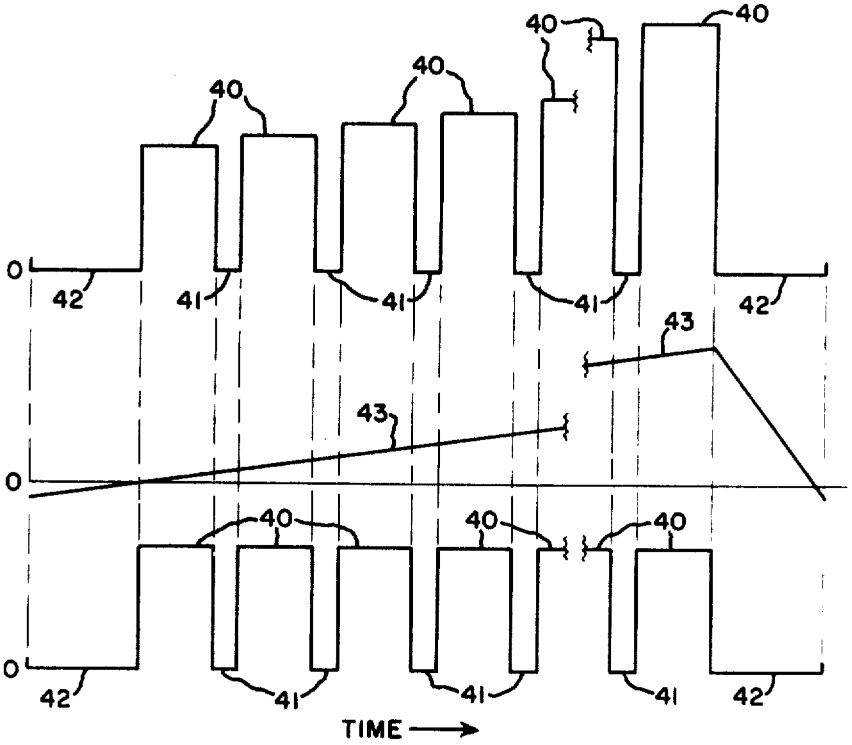
FIGS. 3A, 3B and 3C are diagrams of one set of waveforms used to illustrate the effect of the shading signal generator of the instant invention upon a video signal.
Figures 4A, 4B, 4C:
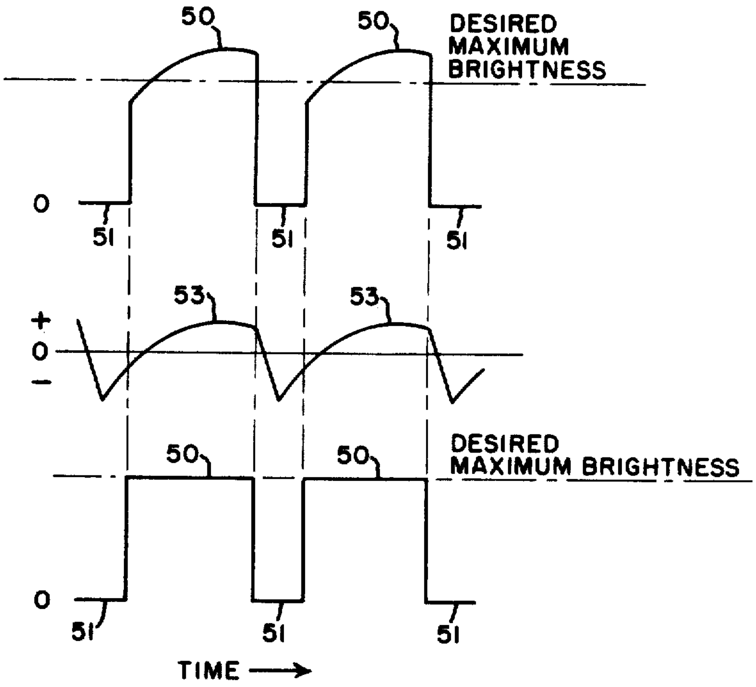
FIGS. 4A, 4B and 4C are diagrams of another set of waveforms used to illustrate the effect of the shading signal generator of the instant invention upon a video signal.

In setting the taps on potentiometers 30, 31, 32 and 33, illustrated in FIG. 2, the uniformly illustrated scene, such as the aforementioned white sheet of cardboard, is viewed on a monitor. While viewing the scene, each of the taps is adjusted so as to reproduce on the monitor, as accurately as possible, the actual shading of the scene being viewed. To accomplish this adjustment, only one tap is adjusted at a time; that is, the taps are successively adjusted to achieve the most accurate shading reproduction. Once these adjustments have been made, they should not require readjustment unless the optical or electrical characteristics of the camera are altered for any reason. The monitor employed during these adjustments is usually a waveform monitor (oscilloscope) upon which the waveforms of FIGS. 3C and 4C are sought to be achieved by positioning the taps on potentiometers 30, 31, 32 and 33. A somewhat subjective check on correctness of the tap settings may be made by viewing the scene on a picture monitor.

The effects of the modulation produced by the circuit of FIG. 1 on the video signal are illustrated in FIGS. 3A, 3B, and 3C, and FIGS. 4A, 4B, and 4C. In FIG. 3A, each waveform 40 represents the signal for one entire horizontal line, respectively, each frame in U. S. television broadcasting practice consisting of 525 lines with alternate lines being presented in each of two successive fields which make up the frame. Each of intervals 41 represents the horizontal flyback time after each line, respectively, and each of intervals 42 represents the vertical interval between successive fields. Only the first and last few horizontal line signal of a single field are illustrated in FIG. 3A, with respect to time.

Under conditions wherein the scene viewed by the camera is a uniformly illuminated, uniformly colored expanse, such as a sheet of white cardboard, the amplitude of each of waveforms 40 should be equal. However, as illustrated in FIG. 3A, the image transmitted by any particular camera may, for example, become brighter toward the bottom of the picture, as evidenced by increasing amplitude of waveforms 40 as the vertical sweep progresses from the top of the picture to the bottom. The apparatus of FIG. 1 compensates for this undesirable condition by furnishing the vertical rate waveform 43, shown in FIG. 3B, to phase splitter 13 from shading signal generator 12. Waveform 43, illustrated on the same time scale as the waveforms of FIG. 3A, simultaneously causes a gradual increase in source-to-drain resistance of FET 10 and a gradual decrease in source-to-drain resistance of FET 11 throughout the duration of each field. As a result, the video signal is increasingly attenuated toward the bottom of the picture, resulting in the desired waveform of FIG. 3C as shown on the common time scale, and a uniformly bright displayed picture over its entire vertical extent.

In addition to the vertical rate distortion illustrated in FIG. 3A, each horizontal line signal usually contains shading distortion also, as illustrated in FIG. 4A wherein each waveform 50 represents the signal for one entire horizontal line, while each of intervals 51 represents the horizontal flyback time following each line. THe signals for only two successive horizontal lines are illustrated in FIG. 4A, with respect to time. When the camera views the uniformly illuminated sheet of white cardboard, the amplitude of each of waveforms 50 should be essentially constant over the entire duration of the line, at the level designated "desired maximum brightness." However, as indicated by the horizontal rate distortion of FIG. 4A, the earlier-occuring portion may be excessively bright, resulting in the left-hand portion of the image being excessively dim and the right-hand portion being excessively bright. This undesirable condition may be compensated for by furnishing the horizontal rate waveform 53, shown in FIG. 4B, to phase splitter 13 of FIG. 1 from shading signal generator 12. Waveform 53, illustrated on the same time scale as the waveforms of FIG. 4A, initially decreases source-to-drain resistance of FET 10 and then causes a gradual increase in source-to-drain resistance of FET 10 from its relatively low value. Simultaneously, waveform 53 initially increases source-to-drain resistance of FET 11 and then causes a gradual decrease in source-to-drain resistance of FET 11. The gradual change in source-to-drain resistance of both FETs 10 and 11 occurs during the interval of each horizontal line. As a result, the video signal is increasingly attenuated toward the right-hand side of the picture. The source-to-drain resistance of FET 10 is sharply decreased and the source-to-drain resistance of FET 11 is sharply increased during each of horizontal flyback intervals 51, preparatory to the start of generation of the next horizontal line. As a result, video waveform 50 at the video output terminal of the circuit of FIG. 1 takes on the shape illustrated in FIG. 4C, as shown on the same time scale as the waveforms of FIGS. 3A and 3B, with the video signal being maintained substantially constant at the desired maximum brightness level as a result of the camera viewing the uniformly illuminated sheet of white cardboard. The displayed picture is thus uniformly bright over its entire horizontal extent.

Because the circuit of FIG. 1 employs two identical FETs with interconnected source electrodes, both FETs may be conveniently formed in a single semiconductor crystal. As integrated circuit of this type is then relatively insensitive to temperature changes since both FETs experience substantially identical temperature levels so that, as source-to-drain impedance increases or decreases due to temperature changes, the impedance changes have opposing effects on the circuit and thus tend to cancel each other. Moreover, in absence of any modulating signal, the circuit causes essentially no modification of video signal linearity.

The foregoing describes an improved video signal shading modulator circuit which is substantially insensitive to temperature changes over the normal operating temperature range of the television camera in which it is installed. The circuit exhibits a wide range in modulation while requiring no reactive circuitry to compensate for degradation in frequency response as a result of variations in modulation levels. Video signal linearity, moreover, is not degraded when the shading signal is not present.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

I claim:

1. A video signal shading modulator comprising:

first and second controllable output resistance devices, said first device being connected in series with circuitry transmitting a video signal and said second device being connected in parallel with said circuitry transmitting said video signal; and shading signal generating circuitry producing first and second output signals of similar waveform but opposite polarity, said shading signal generating circuitry being coupled to a control input of said first and second controllable output resistance devices, respectively, so that said first output signal controls output resistance of said first device and said second output signal controls output resistance of said second device such that output resistance of said first device varies inversely with output resistance of said second device.

2. The video signal shading modulator of claim 1 wherein said first and second controllable output resistance devices each comprises a field effect transistor having source, drain and gate electrodes, said source electrodes being connected to each other, said gate electrode of said first field effect transistor receiving said first output signal from said shading signal generating circuitry, said gate electrode of said second field effect transistor receiving said second output signal from said shading signal generating circuitry, and said drain electrode of said first field effect transistor receiving the unmodulated video signal.

3. The video signal shading modulator of claim 2 wherein said first and second field effect transistor are formed in common on a single crystal of semiconductor material.

4. The video signal shading modulator of claim 1 wherein said shading signal generating circuitry comprises signal generator means for producing repetitive signals of controllable waveform shape and phase splitter circuitry coupled to said signal generator means for producing the inverse of said controllable waveform shape produced by said signal generator means.

5. The video signal shading modulator of claim 4 wherein said signal generator means comprises horizontal rate sawtooth and parabola waveform generators and vertical rate sawtooth and parabola waveform generators, selector means coupled to each of said waveform generators, respectively, for selectively controlling polarity and amplitude of each of said horizontal rate and vertical rate waveforms, respectively, and summation means coupled to each of said selector means for algebraically combining the signals produced by each of said selector means.

6. The video signal shading modulator of claim 5 wherein each of said first and second controllable output resistance devices comprises a field effect transistor having source, drain and gate electrodes, said source electrodes being connected to each other, said gate electrode of said first field effect transistor receiving said first output signal from said shading signal generating circuit, said gate electrode of said second field effect transistor receiving said second output signal from said shading signal generating circuitry, and said drain electrode of said first field effect transistor receiving the unmodulated video signal.

* * * * *